Jan. 28, 1964   J. E. HUNT   3,119,575
HORIZONTAL PAYOFF AND REEL LIFT
Filed Jan. 30, 1962

INVENTOR
BY John Edward Hunt
Emery, Whittemore, Sandoe & Graham
ATTORNEYS.

United States Patent Office 3,119,575
Patented Jan. 28, 1964

3,119,575
HORIZONTAL PAYOFF AND REEL LIFT
John Edward Hunt, St. Charles, Mo., assignor to General Cable Corporation, New York, N.Y., a corporation of New Jersey
Filed Jan. 30, 1962, Ser. No. 169,830
6 Claims. (Cl. 242—129.7)

This invention relates to a horizontal payoff and reel lift, and more particularly to such a lift with rockers by which a heavy reel of wire can be raised from the floor to an elevated payoff position by a rocking of the lift.

Reels of wire, such as magnet wire, are commonly supported with their axes in a substantially horizontal position for payoff into a coil winding machine. Frequently, such winding equipment is operated by female employees and the weight of the reels of wire is in excess of a reasonable load for them to lift into position on horizontal arbors or other supports.

It is an object of this invention to provide a payoff having a spindle that can be inserted into an arbor hole of a reel and that has rockers extending from the spindle and on which the reel can be tilted and at the same time lifted into a payoff position with a minimum of effort by the operator.

Another object of the invention is to provide a horizontal payoff and reel lift of the character indicated and which is a simple and inexpensive construction, the preferred embodiment being made from a single length of tubing that serves as the spindle and rockers, and as a stand for holding the apparatus in position when the spindle and reel are in working position.

In addition to a single length of tubing, this invention can be made with only a thrust washer and a detachable pin for preventing displacement of the reel axially in opposite directions on the spindle.

Other objects, features and advantages of the invention will appear or be pointed out as the description proceeds.

In the drawing forming a part hereof, in which like reference characters indicate corresponding parts in all the views.

Figure 1:
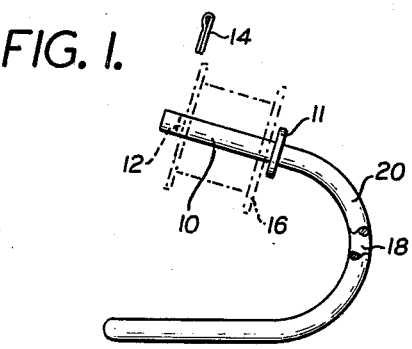
FIGURE 1 is a side elevation of a horizontal payoff and reel lift made in accordance with this invention.

The apparatus shown in FIGURE 1 includes a spindle 10 with a washer 11 at its rearward end. There is a hole 12 through the spindle 10 near its forward end, and a detachable pin, such as a cotter pin 14, can be inserted into the hole 12. The washer 11 and the hole 12 are spaced from one another along the axial length of the spindle 10 by sufficient distance to receive a reel 16 which is shown in phantom by broken lines in FIGURE 1.

The washer 11 prevents displacement of the reel 16 toward the rearward end of the spindle 10 and also serves as a thrust bearing when the reel is rotating on the spindle 10. The pin 14 prevents the displacement of the reel 16 in the other direction. Beyond the spindle 10 there are rockers 18 and 20. One of these rockers is an extension of the spindle 10. In the construction shown in FIGURE 2, the rocker 18 is an extension of the spindle 10. The other rocker 20 has a tapered face 22 which is bonded to the rocker 18 adjacent to the rearward end of the spindle 10, preferably by welding or brazing. The rockers 18 and 20 curve downwardly and away from one another as shown in FIGURES 1 and 2, and then curve inwardly under the spindle 10.

At the lower ends of the rockers 18 and 20, the apparatus has parallel portions 24 and 26 which are joined together at their rearward ends by a loop 28. The spindle 10, rockers 18 and 20, and the parts 24, 26 and loop 28, are all made of a single piece of tubing in the construction shown in the drawing.

The portion of the lift which consists of the parts 24 and 26 and the loop 28 form a stand by which the apparatus is supported from a floor or other underlying support and this stand is indicated generally by the reference character 30. In the preferred construction the lower sides of the parts 24 and 26 and the loop 28 all lie in a common plane which is the plane of the floor on which the stand rests. This provides a simplified construction but not an essential one, since the stand can have an undulating shape so long as there are at least three points of contact with the floor to provide stability.

Figure 2:
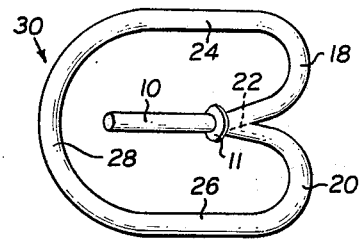
FIGURE 2 is a top plan view of the horizontal payoff and reel lift shown in FIGURE 1.

FIGURE 2 shows the way in which the stand 30 extends horizontally in all directions beyond the spindle 10 so as to provide a stable horizontal payoff for holding the reel 16 after the apparatus has been moved into the position shown in FIGURE 1 by the manipulative steps illustrated in FIGURES 3-6.

For supporting a 12 inch reel of magnet wire weighing from 60 to 90 pounds, the tubing used for constructing the invention can be thin wall conduit having a thickness of $\frac{1}{16}$ of an inch and an outside diameter of 1¼ inches. The tubing used is preferably galvanized steel. These figures are given merely by way of illustration and to bring out the inexpensive and light weight which is made possible by the invention.

Figure 3:
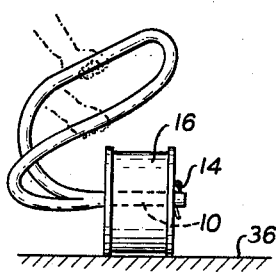
FIGURES 3-6 are perspective views illustrating the sequence of operations by which the invention shown in FIGURES 1 and 2 is used to lift a coil of wire into payoff position.

FIGURE 3 shows the first step in using the invention to lift the reel 16 from a floor 36. The apparatus is turned upside-down, as indicated, and the spindle 10 is inserted into the arbor hole of the reel.

Figure 4:
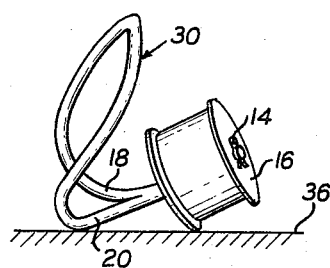

The reel 16 is then tilted, as shown in FIGURE 4, by pulling on the upper portion of the stand 30, this providing a substantial leverage for tilting the reel 16. This tilting movement brings the rockers 18 and 20 into contact with the floor 36.

Figure 5:
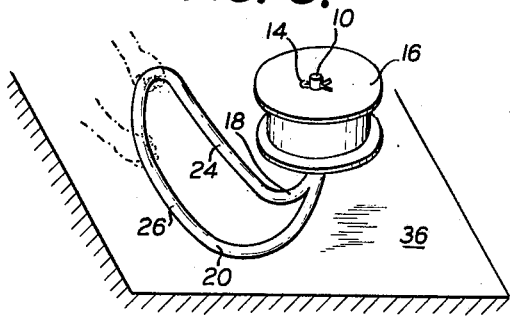

Continued pull applied to the stand 30 causes the rockers 18 and 20 to rock on the floor and lift the reel 16 into the position shown in FIGURE 5. This lifting of the reel from the floor is done with very little effort because of the leverage provided by the substantial length of the stand 30. As the reel 16 moves upwardly, the weight of the reel is carried progressively more and more by the rockers 18 and 20 and the force applied to the stand 30 becomes progressively less.

Figure 6:
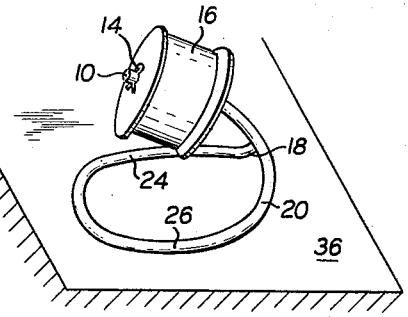

After the spindle 10 passes beyond a vertical position, the weight of the reel 16 tends to move the stand 30 downwardly so that the force which is exerted by the operator is a slight lifting force on the stand 30 so as to prevent the rockers 18 and 20 from rocking too quickly as the reel 16 moves into the position shown in FIGURE 6. Actually, the operator can let go of the stand 30 after it has moved beyond the FIGURE 5 position and the reel 16 is exerting a pressure to rock the rockers 18 and 20 in a counter-clockwise direction.

In FIGURE 6, the apparatus is in the same position as shown in FIGURE 1. The horizontal component of the direction of extent of the axis of the spindle 10 depends upon the arc of curvature of the rockers 18 and 20. This arc of curvature is more than 90 degrees so that the weight of the reel 16 will tend to hold the stand 30 down against the floor and provide stability for the apparatus as a payoff device. It is preferable to have the arc of curvature of the rockers 18 and 20 at least 135 degrees and this arc can be even greater so that the axis of the spindle approaches a horizontal direction. It is preferable, however, to have a slight upward slope toward the front end of the spindle 10 so that the reel 16 rests against the washer 11 as a thrust bearing and there is no axial movement of the reel during a payoff of the wire.

In the construction illustrated, the washer 11 is a steel washer having a thickness of ⅛ inch, an inside diameter of 1¼ inches which is equal to the outside diameter of the spindle 10; and the washer 11 has an outside diameter of 2½ inches. These figures are given merely by way of illustration. The washer is bonded to the spindle 10 by welding or brazing, or by any other suitable means.

The preferred embodiment of the invention has been illustrated and described, but changes and modifications can be made, and some features can be used in different combinations without departing from the invention as defined in the claims.

What is claimed is:

1. A horizontal payoff and reel lift for a reel of wire including a spindle that fits through the arbor hole of a reel, means at the rearward end of the spindle for limiting the extent to which the spindle can be inserted into the arbor hole, two rockers connected with the rearward end of the spindle and curving from a direction generally parallel to the longitudinal extent of the spindle along arcs of curvature through an angle of substantially more than 90 degrees, and a stand at the end of the rockers remote from the spindle including a bearing surface that rests on a floor or other support when the spindle has been rocked from an original horizontal position through substantially more than 90 degrees and beyond a vertical position to a final position by means of a substantially horizontal component of force in a direction extending away from the original direction of extent of the spindle.

2. The horizontal payoff and reel lift described in claim 1 and in which the stand is formed by extensions of the rockers, said extensions having their lower surfaces lying in a common plane.

3. The horizontal payoff and reel lift described in claim 1 and in which the stand is formed by extensions of the rockers in a common plane to form a loop, the rockers and the loop being one piece of material.

4. The horizontal payoff and reel lift described in claim 1 and in which the spindle, rockers and stand are all made of tubular material.

5. The horizontal payoff and reel lift described in claim 1 and in which the means at the rearward end of the spindle is a washer bonded to the spindle and serving as a thrust bearing for a reel of wire located on the spindle when the horizontal payoff and reel lift is loaded and in working position, and in which there is a detachable pin near the other end of the spindle for holding the reel against displacement in an axial direction away from the washer.

6. The horizontal payoff and reel lift described in claim 1 and in which the arc of curvature of the rockers is in excess of 135 degrees and the stand has a horizontal extent beyond the spindle in all directions when the stand is resting on a floor and the spindle is at its working position above the stand.

References Cited in the file of this patent

UNITED STATES PATENTS

| | | |
|---|---|---|
| 1,191,733 | Raymond | July 18, 1916 |
| 1,268,234 | Goodman | June 4, 1918 |